United States Patent [19]

Lowe

[11] 4,353,594

[45] Oct. 12, 1982

[54] VEHICLE SEATS

[75] Inventor: Frederick G. Lowe, Little Billing, England

[73] Assignee: UOP Inc., Des Plains, Ill.

[21] Appl. No.: 70,936

[22] Filed: Aug. 29, 1979

[30] Foreign Application Priority Data

Sep. 1, 1978 [GB] United Kingdom ............... 35283/78

[51] Int. Cl.³ .............................................. A47C 3/00
[52] U.S. Cl. ................................... 297/307; 248/564; 297/355
[58] Field of Search ...................... 297/307, 308, 355; 248/562, 564

[56] References Cited

U.S. PATENT DOCUMENTS

| | | | |
|---|---|---|---|
| 2,432,554 | 12/1947 | Knoedler | 248/564 |
| 2,840,140 | 6/1958 | Harrington | 248/584 |
| 3,090,647 | 11/1963 | Moore | 297/307 |
| 3,109,621 | 11/1963 | Simons et al. | 248/564 |
| 3,774,963 | 11/1973 | Lowe | 297/307 |

FOREIGN PATENT DOCUMENTS

| | | | |
|---|---|---|---|
| 831304 | 5/1938 | France | 297/307 |
| 703385 | 2/1954 | United Kingdom | 248/564 |

*Primary Examiner*—Francis K. Zugel
*Attorney, Agent, or Firm*—James R. Hoatson, Jr.; Barry L. Clark; William H. Page, II

[57] ABSTRACT

A suspension seat has a seat part, which includes a seat support frame and a back rest frame pivoted about a horizontal axis to the seat support frame, the seat part being mounted through a spring suspension on a base part, and a vibration damper of the piston and cylinder type pivotally connected between the seat and base parts. The lower end of the vibration damper is pivoted to the base part.

The upper end of the vibration damper is slidably connected to the back rest frame and pivotally connected to the upper closed end of a yoke whose lower ends are pivoted to the seat part as closely as convenient to the pivotal connection between the vibration damper and the base part to allow tilting of the back rest frame without significantly varying the distance between the ends of the vibration damper.

2 Claims, 3 Drawing Figures

VEHICLE SEATS

BACKGROUND OF THE INVENTION

This invention relates to vehicle seats.

In particular, the invention relates to a vehicle seat of the type in which a seat part, including a seat support and a back rest, is mounted on a base part by means of a suspension which is operative to guide the seat part for upward and downward movement relative to the base part between UP stop and DOWN stop positions. The suspension includes a biasing spring which acts between the base part and the seat part to couterbalance the weight of the seat part and seat occupant.

More particularly the invention concerns the type of suspension which is contained largely if not wholly between the seat part and the base part. An example of such a seat design can be found in our Simons et al U.S. Pat. No. 3,109,621 in which the suspension comprises two parallel spaced pairs of scissor linkages disposed respectively in vertical planes extending fore and aft of the seat, these linkages serving to constrain the movement of the seat to a vertical direction. One significant advantage of a seat suspension which is contained largely between the seat part and the base part is that it facilitates the provision of a back rest which is tiltable about an axis adjacent the bottom of the back rest. Such a back rest can be mounted on a parallel spaced pair of supporting arms which are pivoted at their lower ends to a frame incorporated in the seat part.

In a suspension seat, it is conventional to incorporate a shock absorber or vibration damper in the form of a cylinder containing vibration damping fluid and a piston movable along the axis of the cylinder by means of a piston rod emerging from one end of the cylinder. The movement of the piston is damped by causing the fluid to pass from one side of the piston to the other through a restricted leakage path. Such a damper is a long piece of equipment relative to the dimensions of the seat and is preferably connected at one end to the base part and at its opposite end to a position on the back rest well above the seat cushion. Difficulty however can arise if it is desired to tilt the back rest since the pivot axis of the back rest is close to the level of the seat support, and hence tilting of the back rest in a rearward direction would seriously contract the length of, and interfere with the operation of, a vibration damper directly connected to the back rest.

BRIEF SUMMARY OF THE INVENTION

According to the present invention there is provided a suspension seat comprising a seat part, which includes a seat support frame, a back rest frame, and means pivotally supporting the back rest frame on the seat support frame adjacent the lower end of the back rest frame for tilting movement about a horizontal axis, a base part, a spring suspension supporting the seat part for resilient upward and downward movement on the base part, and a vibration damper, of the type comprising a piston and piston rod movable within a cylinder containing damper fluid, the vibration damper being pivotally connected, at its upper and lower ends respectively, to the seat part and the base part, characterised by a pivotal linkage pivoted at a lower end thereof to the seat part on or adjacent the rearward end of the seat support frame, and pivoted at an upper end thereof to said upper end of the vibration damper, the vibration damper and/or the pivotal linkage adjacent the upper end thereof having a sliding connection with the back rest frame.

BRIEF DESCRIPTION OF THE DRAWINGS

The invention will now be described by way of example with reference to accompanying drawings in which.

Figure 1:
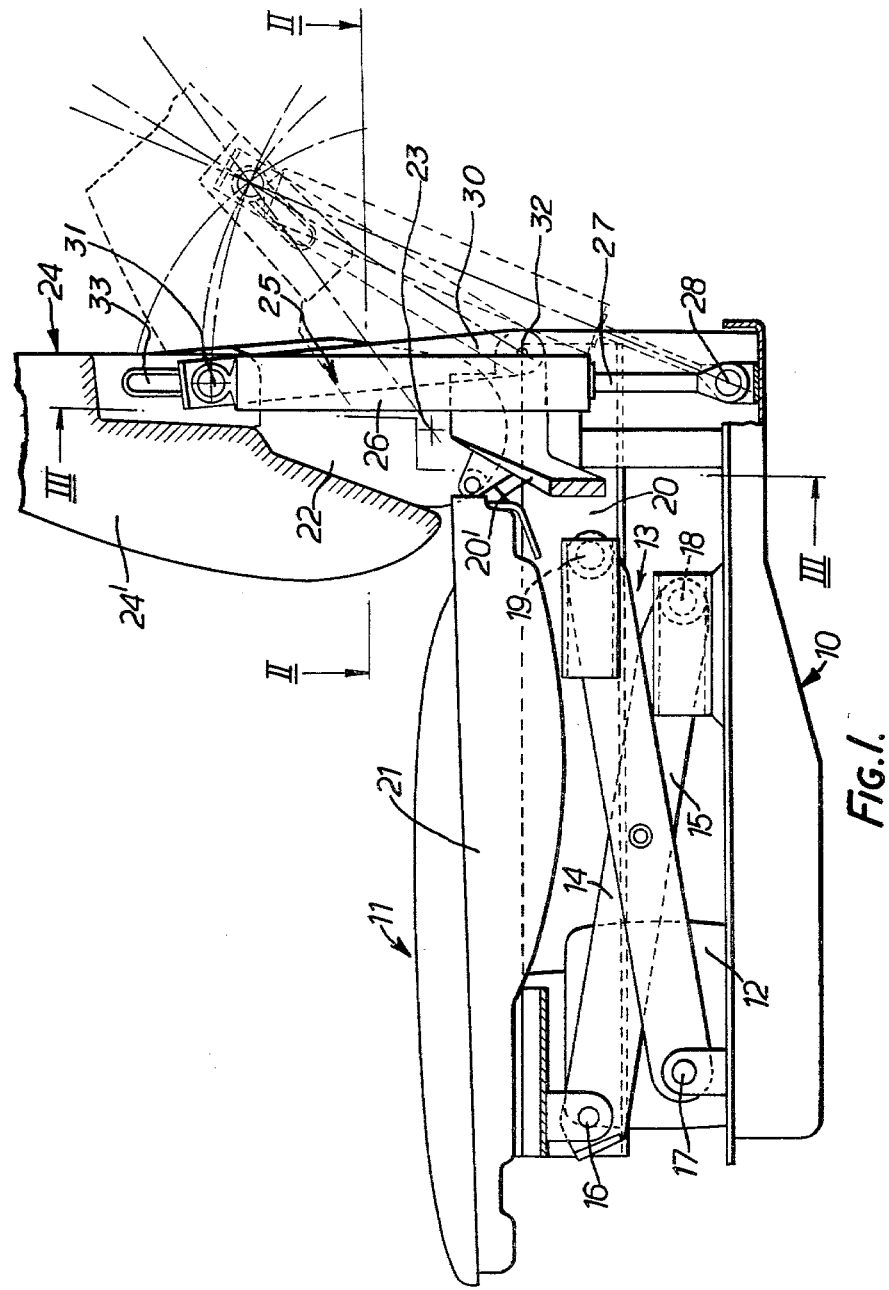
FIG. 1 is a vertical section through a suspension seat in accordance with the present invention.
Figure 2:
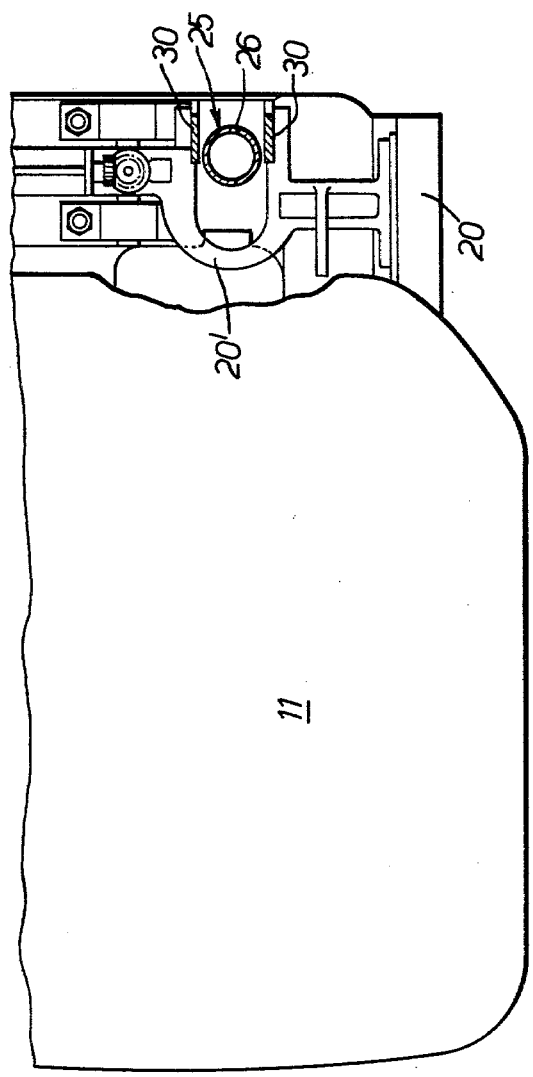
FIG. 2 is a plan view, part sectioned, of the suspension seat of FIG. 1.
Figure 3:
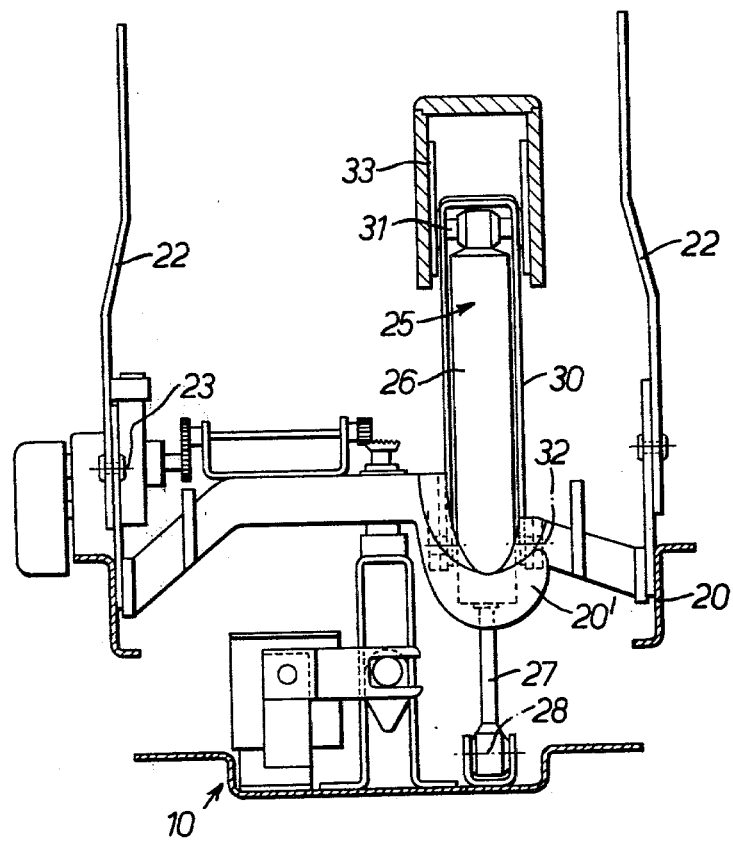
FIG. 3 is a vertical section through the suspension seat of FIG. 1 taken on the lines III—III of FIG. 1 and omitting the details of the back rest.

As indicated in the drawings, the suspension seat comprises a base part 10 on which a seat part 11 is mounted by means of a spring suspension. The spring suspension comprises a gas spring 12 and a scissors linkage suspension 13 comprising two pairs of scissor acting linkage arms 14, 15 pivoted by means of fixed pivot connections 16, 17 at their forward ends to the seat part and base part respectively and by rolling pivot connections 18, 19 at their rearward ends to the base part and seat part respectively. Only one pair of arms 14, 15 is visible in FIG. 1.

The seat part 11 comprises a seat support frame 20 on which a seat pan or seat cushion 21 is mounted. At the rear of the seat support frame, a parallel spaced pair of back rest supporting arms 22 extend upwardly from hinges 23 having a common pivotal axis extending horizontally and transversely of the seat. Thest arms 22 form part of a back rest frame 24 which is therefore tiltable about this axis. The back rest frame 24 supports a back rest cushion 24'.

The vibration damper 25 comprises a cylinder 26 containing a piston from which a piston rod 27 extends, the piston rod being pivoted at 28 to the base part 10.

In order to support the upper end of the damper cylinder 26, an elongate inverted U shaped yoke 30 is provided to fit around the cylinder which is pivoted by a pivot pin 31 within the closed end of the yoke 30 whereas the free ends of the yoke 30 are hinged at 32 to a part of the seat frame 20. The hinges 32, as shown, lie relatively close to the horizontal pivot axis of the back rest frame which passes through hinges 23. Ideally hinges 32 will be as close as possible to the pivot connection 28 between the vibration damper and the base part 10.

The pivot pin 31 is connected to the back rest of the seat by its ends projecting through the yoke 30 and sliding in two prallel spaced guides 33 fixed on the rearward side of the back rest frame.

Consequently, in operation of the seat, upward and downward movement of the seat part 11 relative to the base part 10 under the guidance of the seat suspension is damped by the vibration damper 25 which is connected at one end to the base part and at its opposite end to the yoke 30, the yoke in turn being pivoted to the seat frame 20. If the back rest frame 24 of the seat is tilted rearwardly, the guides 33 for the pivot pin 31 will move the upper end of the cylinder 26 forwards or backwards and the pin 31 will slide longitudinally of the guides 33 to accommodate this movement. If the pivot connections at 32 between the yoke 30 and the seat frame 20 were coincident with the pivot connection at 28 between the vibration damper 25 and the base part 10, pivotal movement of the back rest could take place without any variation in the length of the vibration damper. This however is not normally practicable since this would interfere with the stroke of the seat part. Normally in practice the pivot connection between the yoke and the seat frame will be spaced above the pivot connection between the shock absorber and the base part; accordingly some variation in the length of the vibration damper will occur as a result of tilting the back rest frame but to a very much lesser extent than if the vibration damper were pivoted to a fixed point on the back rest frame.

The seat support frame 20 includes a rearward side member formed by a bar 20' having a U-shaped portion which extends in the fore and aft direction of the seat and within which the vibration damper 25 extends in a substantially upright direction. The length of the U-shaped portion is sufficient to allow forward tilting movement of the back rest frame 24 and hence of the vibration damper without coming into contact with the rearward side member 20' of the seat support frame.

What I claim is:

1. A suspension seat comprising a seat part, which includes a seat support frame, a back rest frame, and means pivotally supporting the back rest frame on the seat support frame adjacent the lower end of the back rest frame for tilting movement about a horizontal axis, said means comprising a base part, a spring suspension supporting the seat part for resilient upward and downward movement on the base part, and a vibration damper of the type comprising a piston and piston rod movable within a cylinder containing damper fluid, the vibration damper being pivotally connected at its upper and lower ends respectively to the seat part and the base part, characterized by a pivotal linkage pivoted at a lower end thereof to the seat part on or adjacent the rearward end of the seat support frame, said pivotal linkage being in the form of a U shaped yoke whose free ends are pivoted to the seat part and whose closed end is pivoted to the upper end of the vibration damper, the vibration damper including the pivotal linkage adjacent the upper end thereof having a sliding connection with the back rest frame, whereby to accommodate tilting of said back rest frame.

2. A suspension seat according to claim 1 characterised in that the seat support frame has a rearward side member formed by a bar having a horizontal U shaped portion which extends in the fore-and-aft direction of the seat and within which the vibration damper extends in a substantially upright direction, the length of the U shaped portion being sufficient to allow tilting movement of the back rest frame and hence of the vibration damper without coming into contact with said rearward side of the seat support frame.

* * * * *